United States Patent
Aganagic et al.

(10) Patent No.: US 10,796,254 B2
(45) Date of Patent: Oct. 6, 2020

(54) SYSTEMS, METHODS AND APPARATUS FOR INTEGRATED OPTIMAL OUTAGE COORDINATION IN ENERGY DELIVERY SYSTEMS

(71) Applicant: Siemens Industry, Inc., Alpharetta, GA (US)

(72) Inventors: Muhamed Aganagic, Minneapolis, MN (US); James G. Frame, Eagan, MN (US); Dzevdet Hadziosmanovic, Minnetonka, MN (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 621 days.

(21) Appl. No.: 14/624,681

(22) Filed: Feb. 18, 2015

(65) Prior Publication Data

US 2015/0234410 A1    Aug. 20, 2015

Related U.S. Application Data

(60) Provisional application No. 61/941,026, filed on Feb. 18, 2014.

(51) Int. Cl.
*G06Q 10/06* (2012.01)
*G05B 15/02* (2006.01)
(Continued)

(52) U.S. Cl.
CPC ....... *G06Q 10/06312* (2013.01); *G05B 15/02* (2013.01); *G06Q 10/06* (2013.01);
(Continued)

(58) Field of Classification Search
CPC .. G05B 13/024; G05B 15/02; G06C 30/0605; G06Q 50/06; G06Q 30/0605;
(Continued)

(56) References Cited

U.S. PATENT DOCUMENTS

| | | | |
|---|---|---|---|
| 7,343,360 B1 * | 3/2008 | Ristanovic | G06Q 30/08 705/412 |
| 2004/0102873 A1 * | 5/2004 | Stark | G05B 23/0267 700/286 |
| 2006/0276938 A1 * | 12/2006 | Miller | G06Q 50/06 700/295 |
| 2008/0077368 A1 * | 3/2008 | Nasle | G05B 17/02 703/4 |

(Continued)

OTHER PUBLICATIONS

Moore, Maintaining the Wind Fleet: Wind Farm Electrical and Rotating Equipment Maintenance Intervals and Methodologies, 114 Power Engineering 8, p. 42, Aug. 2010 (Year: 2010).*

*Primary Examiner* — Charles Guiliano

(57) ABSTRACT

Embodiments provide systems and methods for operating a power system to deliver energy. Embodiments include obtaining initial resource schedules for network analysis using a set of input and data validation functions; performing a network analysis with a full AC power flow in the energy system; executing a security constraint unit commitment function using transmission constraints output from the network analysis; determining an optimized outage schedule using the output of the security constraint unit commitment function; distributing the optimized outage schedule to a generation control and load management system; and directing operation of generator resources and managing loads to deliver energy to customers based on the optimized outage schedule. Numerous other aspects are provided.

20 Claims, 5 Drawing Sheets

(51) Int. Cl.
    *G06Q 50/06*  (2012.01)
    *G05F 1/66*  (2006.01)
    *H02J 3/14*  (2006.01)
    *H02J 3/00*  (2006.01)

(52) U.S. Cl.
    CPC .............. *G06Q 50/06* (2013.01); *G05F 1/66* (2013.01); *H02J 3/003* (2020.01); *H02J 3/14* (2013.01)

(58) Field of Classification Search
    CPC ... G06Q 10/06312; G06Q 10/06; H02J 3/003; H02J 3/14; G05F 1/66
    USPC ......... 700/295, 291, 286; 705/26, 7.35, 412, 705/7.12, 7.22
    See application file for complete search history.

(56) References Cited

U.S. PATENT DOCUMENTS

| | | | | |
|---|---|---|---|---|
| 2011/0106328 A1* | 5/2011 | Zhou | .................... | G05B 13/024 700/291 |
| 2012/0150679 A1* | 6/2012 | Lazaris | .............. | G06Q 30/0605 705/26.2 |
| 2012/0253539 A1* | 10/2012 | McMullin | ................ | H02J 3/006 700/297 |
| 2013/0204443 A1* | 8/2013 | Steven | ................... | G06Q 50/06 700/286 |
| 2013/0346139 A1* | 12/2013 | Steven | ................... | G06Q 10/00 705/7.24 |
| 2015/0278968 A1* | 10/2015 | Steven | ................... | G06Q 50/06 705/7.35 |

\* cited by examiner

500A

| Resource | | | Repair | | Repair | |
|---|---|---|---|---|---|---|
| Name | ID | Outage | Duration | ID | Schedule | Period |
| GEN1 | 464 | 9-11 | 3 | 251 | 2-4 | 0-23 48-71 |
| GEN2 | 414 | 7-12 | 5 | 252 | 1-5 | 0-47 |
| GEN3 | 38970 | 7-17 | 10 | 253 | 11-20 | 0-47 |
| Line 1 | 102494 | 9-19 | 10 | 343 | 58-67 | 0-71 |
| Line 2 | 102583 | 8-19 | 11 | 344 | 56-66 | 0-71 |
| Line 3 | 102704 | 55-72 | 18 | 341 | 46-63 | 0-95 |

500B

SYSTEMS, METHODS AND APPARATUS FOR INTEGRATED OPTIMAL OUTAGE COORDINATION IN ENERGY DELIVERY SYSTEMS

RELATED APPLICATIONS

The present application claims priority to U.S. Provisional Application No. 61/941,026 titled "INTEGRATED OPTIMAL OUTAGE COORDINATION" filed Feb. 18, 2014, which is incorporated herein by reference for all purposes.

FIELD

The present invention relates to operating energy delivery systems, and more specifically to integrated optimal outage coordination.

BACKGROUND

Electricity is by its nature difficult to store and has to be available on demand. Consequently, unlike other products, it is not possible, under normal operating conditions, to keep it in stock, ration it or have customers queue for it. Furthermore, demand and supply vary continuously. There is therefore a physical requirement for a controlling agency, the independent system operator (ISO), to coordinate the dispatch of generating units to meet the expected demand of the system across the transmission grid. If there is a mismatch between supply and demand, the generators speed up or slow down causing the system frequency (either 50 or 60 hertz) to increase or decrease. If the frequency falls outside a predetermined range the system operator will act to add or remove either generation or load. In addition, the laws of physics determine how electricity flows through an electricity network. Hence the extent of energy lost in transmission and the level of congestion on any particular branch of the network will influence the economic dispatch of the generation units.

Thus, in economic terms, electricity (both power and energy) is a commodity capable of being bought, sold and traded. An electricity market is a system for effecting purchases, through bids to buy; sales, through offers to sell; and short-term trades, generally in the form of financial or obligation swaps. Bids and offers use supply and demand principles to set the price. Long-term trades are contracts similar to power purchase agreements and are generally considered private bi-lateral transactions between counter-parties. Most electricity markets, and many other markets, function in accordance with a bid-based, security constrained, economic dispatch model.

Wholesale transactions (e.g., bids and offers) in electricity are typically cleared and settled by the market operator or a special-purpose independent entity charged exclusively with that function. Market operators do not clear trades but often require knowledge of the trade in order to maintain generation and load balance. The commodities within an electric market generally include two types: power and energy. Power is the metered net electrical transfer rate at any given moment and is measured in megawatts (MW). Energy is electricity that flows through a metered point for a given period and is measured in megawatt hours (MWh).

Markets for energy-related commodities trade net generation output for a number of intervals usually in increments of 5, 15 and 60 minutes. Markets for power-related commodities required and managed by (and paid for by) market operators to ensure reliability, are considered ancillary services and include such names as spinning reserve, non-spinning reserve, operating reserves, responsive reserve, regulation up, regulation down, and installed capacity.

In addition, for most major operators, there are markets for transmission congestion and electricity derivatives such as electricity futures and options, which are actively traded. These markets developed as a result of the restructuring of electric power systems around the world.

The scope of each electricity market includes the transmission grid or network that is available to the wholesalers, retailers and the ultimate consumers in any given geographic area. Markets may extend beyond national boundaries.

In order to insure consistent and reliable delivery of electricity to businesses, hospitals, homes, etc., electricity markets are structured to efficiently and timely effect transactions. For an economically efficient electricity market to be successful it is helpful that a number of criteria are met, namely the existence of a coordinated spot market that has bid-based, security-constrained, economic dispatch. The system price in the day-ahead market is, in principle, determined by matching offers from generators to bids from consumers at each node to develop a classic supply and demand equilibrium price, usually on an hourly interval, and is calculated separately for sub-regions in which the system operator's load flow model indicates that constraints will bind transmission imports.

Necessary repair and maintenance of system components results in scheduled outages to parts of the energy delivery system. To realize stable, efficient electricity markets and delivery systems capable of consistent delivery of energy at prices that do not have dramatic fluctuations, it is desirable for the ISOs to coordinate the outages. Therefore, what is needed are systems, methods and apparatus for integrated optimal outage coordination.

SUMMARY

In some embodiments, a method of operating a power system to deliver energy is provided. The method includes obtaining initial resource schedules for network analysis using a set of input and data validation functions; performing a network analysis with a full AC power flow in the energy system; executing a security constraint unit commitment function using transmission constraints output from the network analysis; determining an optimized outage schedule using the output of the security constraint unit commitment function; distributing the optimized outage schedule to a generation control and load management system; and directing operation of generator resources and managing loads to deliver energy to customers based on the optimized outage schedule.

In other embodiments, a system for operating a power system to deliver energy is provided. The system includes an integrated optimal outage coordination (IOOC) system; an equipment outage scheduler coupled to the IOOC system; an energy management system coupled to the IOOC system; an interface operable to couple a plurality of market participants to the IOOC system; a forecasting application coupled to the IOOC system; and a transmission network database coupled to the IOOC system. The IOOC includes a processor coupled to a memory, the memory operative to store instructions executable on the processor to: obtain initial resource schedules for network analysis using a set of input and data validation functions; perform a network analysis with a full AC power flow in the energy system; execute a security constraint unit commitment function using transmission constraints output from the network analysis; determine an optimized outage schedule using the output of the security constraint unit commitment function; and distribute the optimized outage schedules to a generation control and load management system for directing operation of generator resources and managing loads to deliver energy to customers based on the optimized outage schedule.

In still other embodiments, an integrated optimal outage coordination (IOOC) system is provided. The IOOC system includes an IOOC application executing on a processor within a computer; an IOOC database accessible by the IOOC application; an IOOC user interface operable to invoke the IOOC application, collect data from external interfaces, and access the IOOC database; a network analysis application executable by the IOOC application and operable to return a network model to the IOOC application; and a solver executable by the IOOC application and operable to return an optimal outage schedule to the IOOC application.

Numerous other aspects are provided in accordance with these and other aspects of the invention. Other features and aspects of the present invention will become more fully apparent from the following detailed description, the appended claims and the accompanying drawings.

DESCRIPTION

Figure 1:
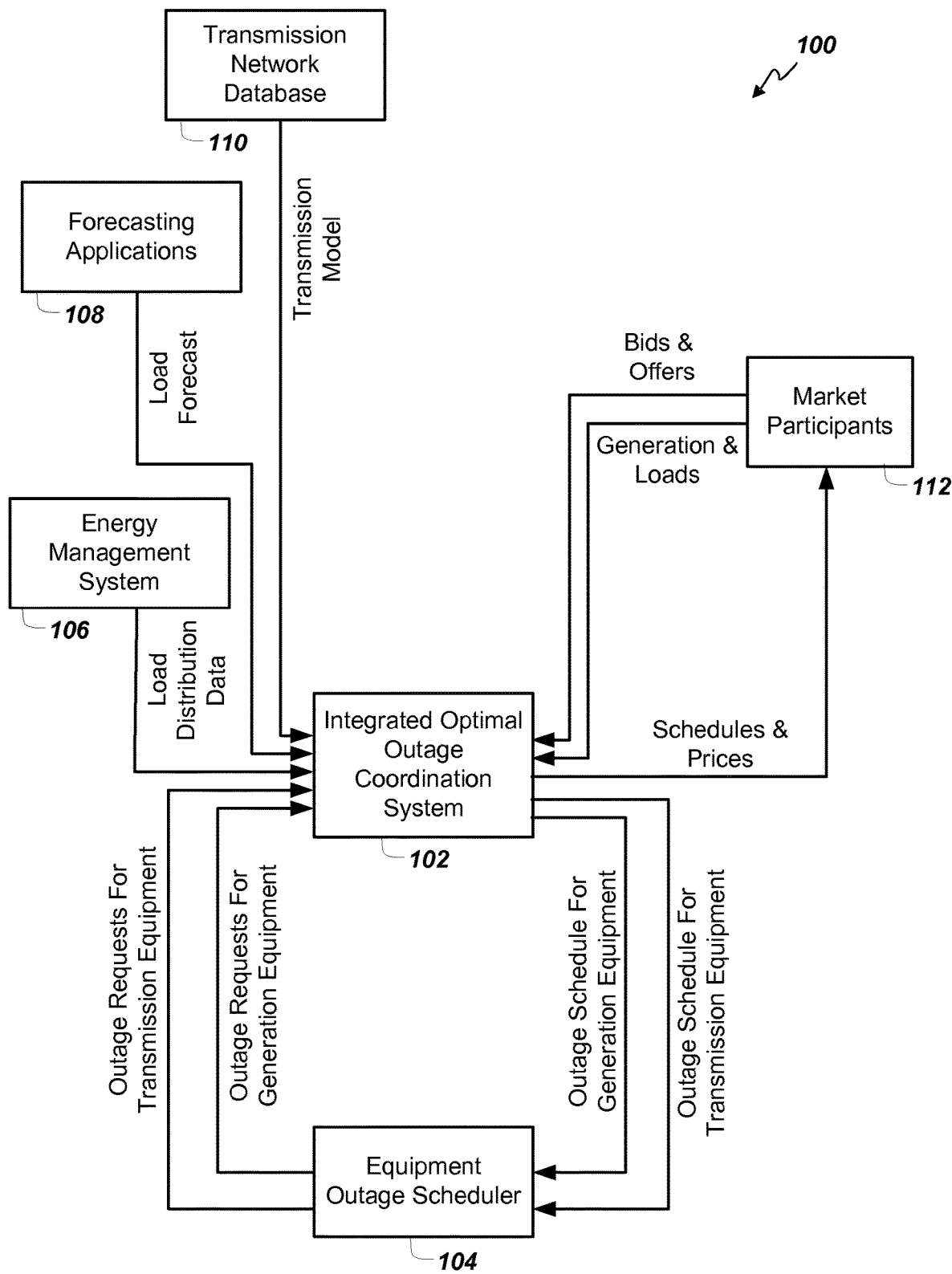
FIG. 1 is a schematic depiction of a portion of an example energy delivery system including an integrated outage coordination system according to embodiments of the present invention.

Embodiments of the present invention provide systems, apparatus and methods for integrated optimal outage coordination for electricity delivery, or more generally, energy delivery systems. Embodiments of the present invention include software applications and systems adapted to help independent system operators (ISOs) and their market participants to address challenges related to decision making regarding scheduling of repair and maintenance outages of generation and distribution resources. Embodiments implement a generic model of the energy market, repair requests from market participants to ISOs, and scheduling rules in order to support a wide range of regulatory and tariff environments encountered across the energy delivery industry.

According to conventional energy market operating agreements, market participants are required to submit requests to their respective ISOs for authorization for any outages because outages can have serious effects on both system operations and market outcomes. Correspondingly, the ISOs are obliged to respond in timely manner with a decision to approve, deny or reposition the outages. In many instances, as part of the decision making process, an ISO may need to perform very complex analyses in order to ensure security and reliability of the overall system. ISOs also need to ensure the outages do not have undesirable effects on their commodity markets. For example, a poor decision with respect to scheduling outages can result in a shortage of electricity to particular market participants that could create instability (e.g., not meeting voltage stability requirements) and an undesirable price spike. When planning whether to approve a scheduled outage, in order to assess the impact of the outage, an ISO often uses a variety of analytical tools such as power flow (PF) analysis, other network analysis (NA), voltage stability assessment (VSA), market simulation tools, etc. However these tools are not integrated with each other and the resulting convention piecemeal approach of the analysis of outages, which is largely unavoidable using conventional methods, necessarily results in suboptimal outcomes.

Embodiments of the present invention provide systems, methods, apparatus, and software applications adapted to support decision making regarding planned future outage requests submitted for approval within a predetermined amount of time in advance of the requested outage time. Typically, the requests for outage are submitted for approval one or two weeks in advance of the requested time but in some embodiments, the requests can be for times further into the future.

Embodiments of the invention are adapted to achieve two goals in particular. First, the system generates coordinated outage schedules for all generation and transmission resources wherein the outage schedules respect the relevant operating and security constraints of the power delivery system. Second, the generated outage schedule is adapted to minimize the total cost of operations and repairs. As used above, the term "all generation and transmission resources" is intended to refer to the components of the underlying market. This means that the system of embodiments of the present invention includes consideration of any and all resources whose outages could affect the market outcomes (e.g., operating schedules and prices, in particular) as well as operational and security constraints observed by the market (e.g., security-constrained unit commitments (SCUCs)). For example, outage of a specific generator may necessitate a higher level of power output of a more expensive generator. Outage of network equipment (e.g., a transmission line) can cause congestion and/or may result in curtailment of output of a lower cost generator. These outages result in increases in marginal cost which affect the market welfare and cause increased prices.

Using the very same criteria that is used to commit and schedule (e.g., to make SCUCs) resources in the market, embodiments of the system of the present invention include an optimization based application that determines a schedule for future outages based on a priority designed to best achieve the two primary goals listed above. The cost of repairs, including possibly the cost of repair denial, can also be made a part of the objective function of the optimization.

Further, by adopting this goal optimization approach to outage scheduling, an ISO also promotes the common welfare (e.g., cost minimization, resource conservation, etc.) consistent with its mission since the necessary maintenance work will be scheduled at the times that are most beneficial from the market perspective. In addition, market participants are better served by the ISO since the ISO is better able to guide the market participants to more optimal outage schedules that result in a maximized market valuation of their resources. As a consequence of maximizing market valuation, the stakeholders (e.g., market participants) are additionally motivated to share more information about their outage requirements and to give as much flexibility (e.g., scheduling alternative times/options) to their ISO as possible which allows improved optimization. In this manner, embodiments of the present invention can create a cyclical synergy between ISOs and their market participants.

At the core of the system of embodiments of the present invention is the integrated optimal outage coordination (IOOC) model used to simulate the energy delivery system including the market. In some embodiments, there are two fundamental parts of the overall IOOC model. The first part is a model of the market that describes all the features of the actual day-ahead market (DAM). The second part is an outage (repair) model. The outage model describes all pertinent aspects of the repairs (e.g., frequency, duration, cost, risk, etc.) These two models (e.g., defined in terms of objective functions and constraints) are tightly integrated so as to ensure that the effects of the outages on the market outcome are correctly captured, and conversely, that the outages are scheduled consistent with the imposed constraints, at times that best benefit (e.g., least harm) the market.

Resources that included in the outage model and are subject to outage scheduling generally fall into two broad categories. The first category, called generating equipment, includes generators, dispatchable loads, storage units, etc. The second category, called network facilities, includes transmission lines and corridors, power transformers and phase shifters, nomograms, bus breakers (optional), etc.

According to embodiments of the present invention, the IOOC model implements a very comprehensive model of outage requests. An outage can be characterized in the model as either a two-state (e.g., ON/OFF) type outage or a derate (i.e., a lowering of the rated capability) outage of a resource such as, for example, reduced maximum power capacity or reduction of ramp capability (e.g., reduced ability to increase output in terms of time). Similarly, network facility outages can be either a two-state type (e.g., facility is taken out of service completely) or a derate type (e.g., facility is only de-rated and remains online). Examples of some of the key attributes of outage requests that market participants make to the ISO include outage duration, outage cost as a function of time and/or duration, one or more allowed repair windows with penalties for window violations (i.e., over-runs), and repair request groupings and/or group constraints (e.g., maximum/minimum number of simultaneous repairs within the group, repair crew/resources constraints, etc.).

In some embodiments, the IOOC model of the system includes a full SCUC market model with the objective function based on reference bids. An example of such a commercially available SCUC market model includes the Spectrum Power™ Security-Constrained Unit Commitment software system manufactured by Siemens Industry, Inc. Details of another example SCUC model can be found in U.S. Pat. No. 7,349,882 issued Mar. 25, 2008 to Bjelogrlic et al. which is hereby incorporated herein for all purposes.

An example of an objective function for a SCUC model based on reference bids is:

$$\min \sum_{h=1}^{T} \sum_{i=1}^{N} \left[ SUC_i(1 - U_{i,h-1})U_{i,h} + MLC_{i,h}U_{i,h} + \int_{P_{mini}}^{P_{i,h}} C_{i,h}(P_{i,h})dP + \right.$$

-continued $$\left. C_{i,h}^{RU} \cdot RU_{i,h} + C_{i,h}^{RD} \cdot RD_{i,h} + C_{i,h}^{SP} \cdot SP_{i,h} + C_{i,h}^{NS} \cdot NS_{i,h} \right]$$

Where
h represents an Hour index
T represents the Total number of hours in the time horizon
i represents a Resource index
N represents the total Number of resources
$P_{i,h}$ represents the Power output of resource i in hour h
$RU_{i,h}$ represents the Regulation Up provided by resource i in hour h
$RD_{i,h}$ represents the Regulation Down provided by resource i in hour h
$SP_{i,h}$ represents the Spinning reserve provided by resource i in hour h
$NS_{i,h}$ represents the Non-Spinning reserve provided by resource i in hour h
$C_{i,h}(P_{i,h})$ represents the Cost ($/hour) as a piece-wise constant function of output (MW) for resource i in hour h
$C_{i,h}^{RU}$ represents the bid Cost ($/MW) of regulation up (MW) for resource i in hour h
$C_{i,h}^{RD}$ represents the bid Cost ($/MW) of regulation down (MW) for resource i in hour h
$C_{i,h}^{SP}$ represents the bid Cost ($/MW) of spinning reserve (MW) for resource i in hour h
$C_{i,h}^{NS}$ represents the bid Cost ($/MW) of non-spinning reserve (MW) for resource i in hour h
$SUC_i$ represents the Start-Up Cost ($/start) for resource i
$MLC_{i,h}$ represents the Minimum Load Cost ($/hr) for resource i in hour h
$U_{i,h}$ represents commitment status; =0 if resource i is off-line, and =1 if resource i is online, in hour h Further details of this example SCUC model can be found in the California ISO Technical Bulletin 2009 Jun. 5 entitled "Market Optimization Details", revised Nov. 19, 2009 and available at http://www.caiso.com/23cf/23cfe2c91d880.pdf which is hereby incorporated herein for all purposes.

In the SCUC model included in embodiments of the present invention, one hour ahead can be used as the smallest unit of time but other values can also be used. Non-uniform time intervals can be used to help manage the problem size when outages are being planned far into the future (e.g., multiple months ahead and/or annual plans). Inclusions of particular market model features, as appropriate, are controlled by a set of standard constraint database (DB) flags (e.g., ancillary service (AS) commodities (such as regulation, spin reserve, non-spin reserve, etc.), AS cascading, forbidden regions, dynamic ramps, etc.). Security, network, and other constraints are modeled with the same level of detail as in the actual SCUC market model.

Turning now to FIG. 1, a portion of an example energy delivery system 100 including an example of an integrated optimal outage coordination (IOOC) system 102 is depicted. An equipment outage scheduler 104 provides the IOOC system 102 with both outage requests for generation equipment and for transmission equipment. In return, the IOOC system 102 provides optimized outage schedules for both generation equipment and transmission equipment to the equipment outage scheduler 104. To determine the optimized outage schedules, the IOOC system 102 receives load distribution data from an energy management system 106, load forecast information from forecasting applications 108, transmission model information from a transmission network database 110, and bids and offers as well as generation and load data from market participants 112. The market participants 112 receive schedules and prices from the IOOC system 102. Each element of the energy delivery system 100 shown can be implemented using one or more computers executing software applications adapted to implement the listed functions and networked together to facilitate communication of the information described.

In some embodiments, the equipment outage scheduler 104 includes one or more software applications that enable entry, storage, review and maintenance of data (e.g., using a database management system (DBMS)) regarding requested equipment outages (e.g., including parameters such as equipment identifiers, dates, types, durations, etc.) and their statuses such as submitted, approved, denied, or postponed. In some embodiments, the energy management system 106 includes hardware and software systems managing minute to minute and day to day operations of energy systems of markets, countries or regions. An example of a commercially available energy management system 106 is the Spectrum Power™ Energy Market Management (EMM) system manufactured by Siemens Industry, Inc.

In some embodiments, the forecasting applications 108 include one or more software applications adapted to forecast future electrical power needs and/or consumption (e.g., load demand on an hourly basis, a fifteen minute interval basis, thirty minute interval basis, or the like) based on weather forecasts (e.g., predicted temperature, wind, sunlight, storms, etc.) and other factors (e.g., major sport events, public gatherings, etc.). In some embodiments, the transmission network database 110 includes a database that stores information regarding the network equipment such as transmission lines, power transformers, switches and circuit breakers, and their current and future configurations (e.g., the various ways the equipment is connected). In some embodiments, the transmission network database 110 can be used by and include software applications that, for example, perform AC power flow analysis.

In some embodiments, the market participants 112 include applications and databases controlled by market participants (e.g., owners of generation and transmission equipment, load consumers, energy traders, etc.) for entering, accessing, storing, and maintaining historical records regarding supply and demand bids and offers (e.g., price and quantity) from the market participants as well as current information of such bids and offers a long with information regarding the generation and transmission equipment used.

Figure 2:
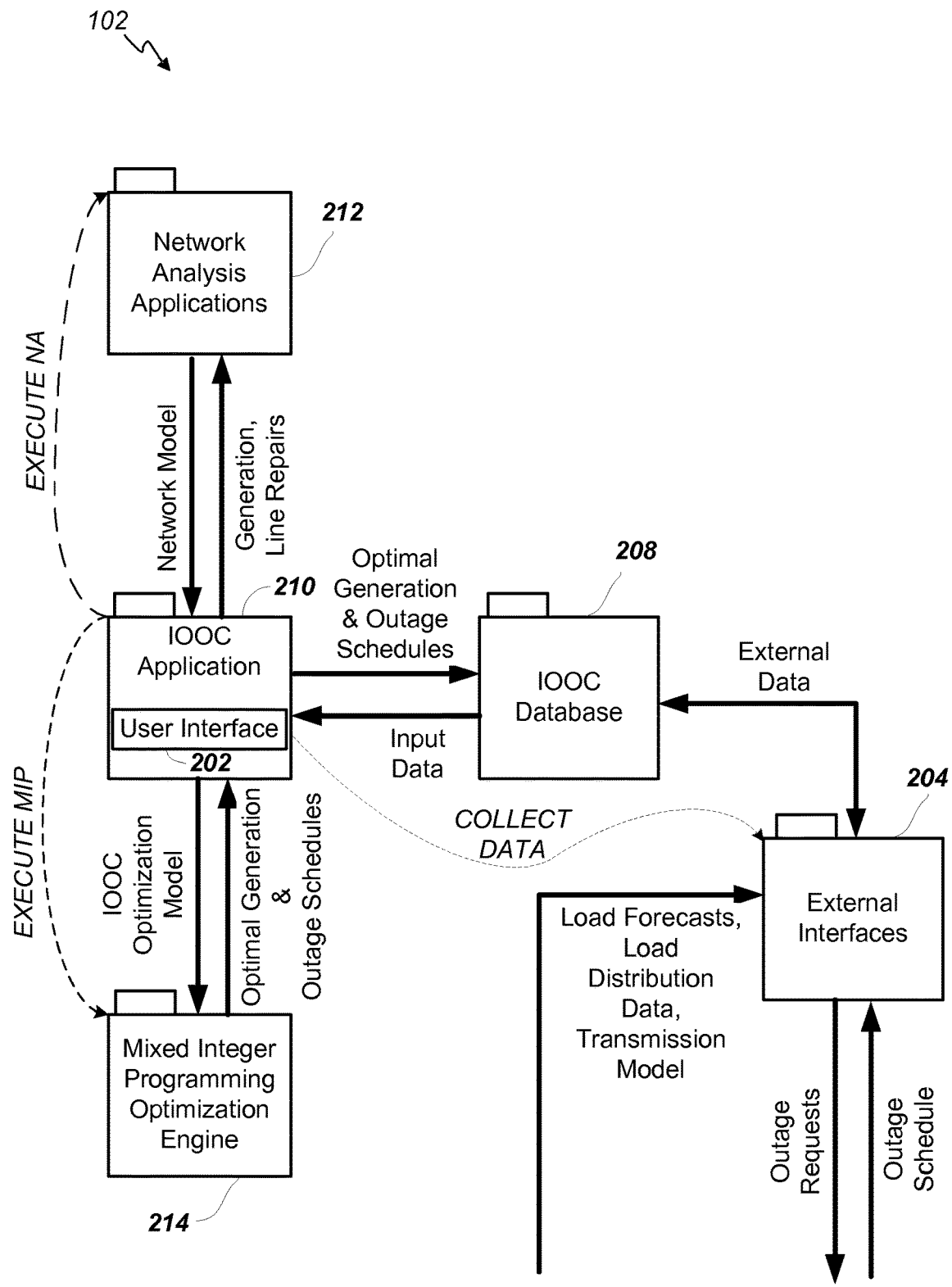
FIG. 2 is a schematic depiction of details of an example integrated outage coordination system according to embodiments of the present invention.

FIG. 2 depicts an example embodiment of details of the IOOC system 102 of FIG. 1. The IOOC system 102 is controlled by an IOOC Application 210 than in some embodiments can include a user interface 202 used to access and control the IOOC system 102. The IOOC application 210 is used to initiate collection of data from external interfaces 204 to, for example, the equipment outage scheduler 104 (FIG. 1), the energy management system 106 (FIG. 1), the forecasting applications 108 (FIG. 1), and the transmission network database 110 (FIG. 1) of the energy delivery system 100 (FIG. 1) and other applications. The collected data is stored in the IOOC database 208. Once the data has been collected and stored, the IOOC application 210 initiates execution of network analysis applications 212 to determine a network model based on needed generation and line equipment repair and maintenance information that is provided by the IOOC application 210 based on input data from the IOOC Database 208. Once the network model has been determined, the IOOC application 210 initiates execution of a mixed integer programming (MIP) optimization engine 214 and provides the network model to the MIP optimization engine 214 as an IOOC optimization problem model. The MIP optimization engine 214 determines and returns the optimal generation and outage schedules which are stored back in the IOOC database 208 for access by the external interfaces 204. Note that the components of the IOOC system 102 can be implemented on one or more computers (e.g., networked together) each with one or more processors and memories, the memories operable to store instructions executable on the processors to implement the components of the IOOC system 102.

In some embodiments, the user interface 202 within the IOOC application 210 includes client applications and/or internet webpages enabling the user to provide/modify the input data and observe the results/outputs of the IOOC system 102. The user interface 202 can include a set of displays for data/parameter presentation and/or editing as well as various controls for initiating and terminating IOOC application functions (e.g., execute IOOC application 210, collect data, execute NA applications, execute MIP, store data, distribute data, etc.) In some embodiments, the external interfaces 204 include one or more applications for communicating with, for example, market participant applications/databases, the energy management system, load forecast applications, and other applications/databases that provide data to, or receive data from, the IOOC system 102. In some embodiments, the IOOC database 208 includes a commercially available database management system (DBMS) such as the Oracle RDBMS manufactured by Oracle Corporation of Redwood City, Calif. The IOOC database 208 is adapted to store IOOC data under the control of the IOOC application 210. In some embodiments, the IOOC application 210 includes one or more software applications, algorithms and procedures as described herein for implementing embodiments of the integrated optimal outage coordination system 102 and methods of the present invention. In some embodiments, the network analysis applications 212 include power flow analysis, contingency analysis, network topology analysis, state estimation, fault analysis, load forecasting analysis, power system stability analysis, volt/VAr control analysis, power quality analysis, optimal power flow analysis and optimal resource scheduling analysis applications. In some embodiments, the MIP optimization engine 214 can include commercially available solvers such as CPLEX, GuRoBi, or other third-party solver.

Figure 3:
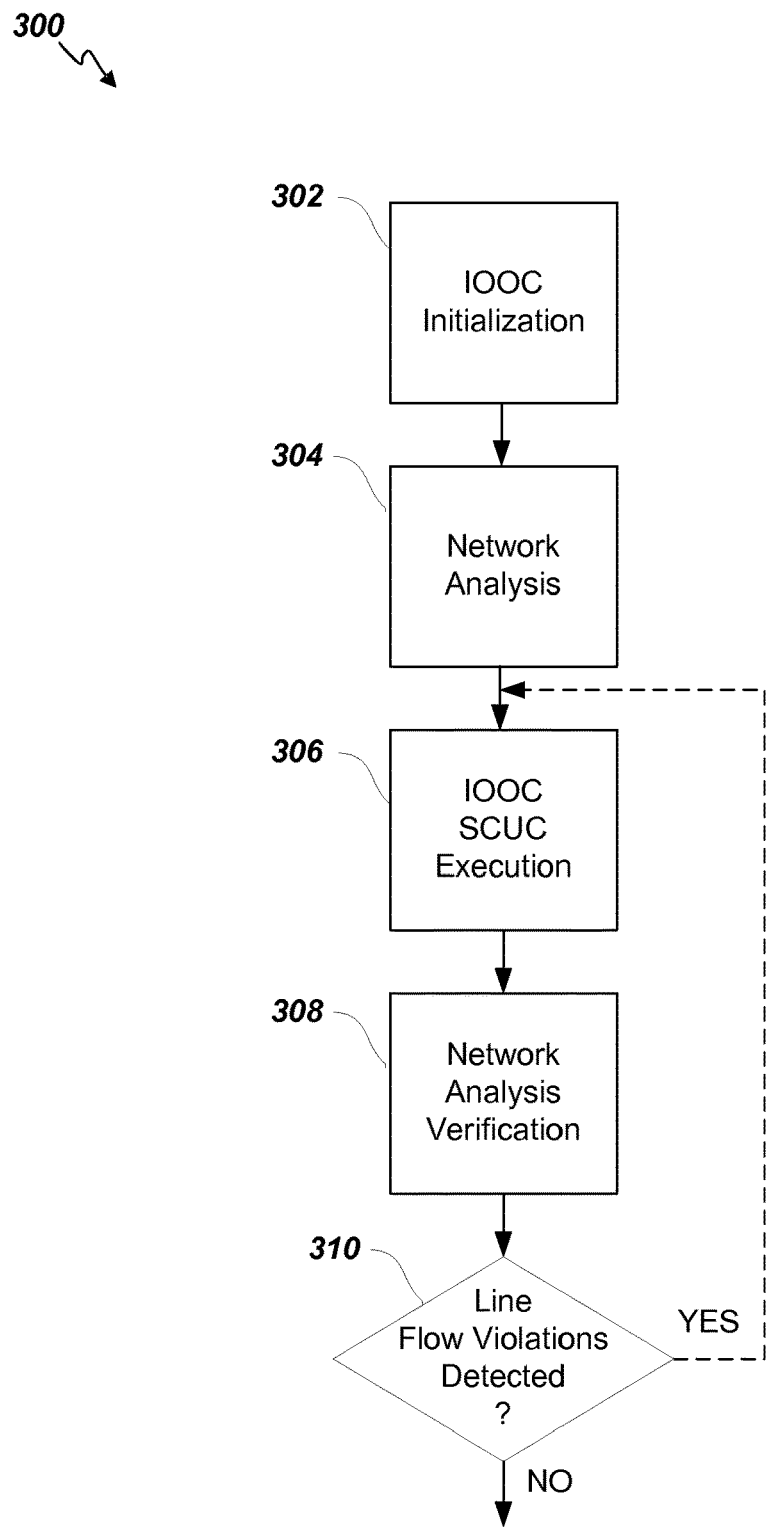
FIG. 3 is a flowchart depicting an example method according to embodiments of the present invention.

Turning now to FIG. 3, a flowchart depicting a high level representation of an IOOC computational method 300 is provided. Note that in some embodiments, the IOOC computation method 300 can be based the same computational paradigm used to compute the day ahead (DA) market SCUC network analysis for determining pricing and generation schedules.

In some embodiments, once an outage is authorized by the IOOC system 102 or in-progress, the method 300 will treat it as a fixed constraint and will not consider changing the time/date of the outage. In other embodiments, authorized outages (e.g., previously scheduled by the IOOC system 102 and communicated to the market participant 112 as an approved request or otherwise scheduled outage) can be revoked up until a predetermined time period before the scheduled outage and rescheduled at a more optimal time based on new data about the market and/or equipment status. In this manner, embodiments of the present invention can dynamically adjust the outage schedules to accommodate changing conditions.

In some embodiments, the IOOC computation method 300 starts with the IOOC system initialization (302). During IOOC system initialization, initial input data (e.g., new and existing configuration information, resource information, market participant information, outage requests, etc.) is entered and data validation functions are executed. In addition, during IOOC system initialization, the initial input data is used to run an unconstrained unit commitment optimization execution to generate initial resource schedules upon which subsequent network analysis is performed.

Once the IOOC system 102 is initialized, a network analysis (NA) is performed (304) based upon a full power flow (e.g., the energy delivery system 100 is modeled with the maximum possible alternating current (AC) power flowing through it). The initial NA is performed using a topology configuration with all of the requested outages OFF (e.g., not authorized, all resources and lines operational). In some embodiments, the NA includes one or more software applications adapted to perform AC power flow analysis. The output of the NA provides direct current power flow (DC PF) transmission constraints that will be passed on to the subsequent SCUC optimization execution. The set of transmission constraints output from the NA includes constraints for outage line elements, elements determined to be critical by the NA itself, and any additional elements requested to be checked by the user. This set of constraints is passed to the subsequent IOOC SCUC optimization execution.

Next, the IOOC computational method 300 executes an IOOC SCUC optimization run (306) that builds on the day-ahead market model (e.g., as described in previously incorporated U.S. Pat. No. 7,349,882 and/or in the previously incorporated California ISO Technical Bulletin 2009 Jun. 5 entitled "Market Optimization Details") which is extended to describe the effects of implementing any possible combination of the requested outages. In some embodiments, the day-ahead market model is extended by encompassing several days or weeks instead of just a single day. The market is typically confined to a single day or a couple of days in the future. However, outages are planned for dates further into the future (e.g., a week or several weeks in the future) and often for periods longer than a day. By extending the market model, the IOOC system takes advantage of having the future outage information.

The underlying problem model can be expressed as a large and complex mixed integer programming (MIP) problem. For example, in some embodiments, the problem can be expressed and solved using linear programming (LP), quadratic programming (QP), quadratically constrained programming (QCP), mixed integer linear programming (MILP), mixed-integer quadratic programming (MIQP), and/or mixed-integer quadratically constrained programming (MIQCP). In some embodiments, the problem model can be solved using commercially available MIP solver software applications such as, for example, the IBM ILOG CPLEX Optimization Studio (CPLEX) manufactured by IBM Corporation of Armonk, N.Y., USA or the Gurobi Optimizer (GuRoBi) manufactured by Gurobi Optimization, Inc. of Houston, Tex., USA. The IOOC application 210 can include an implementation of a generalized solver application programming interface (API) which enables the use of commercially available solvers such as CPLEX, GuRoBi, or other third-party solver.

Based on the transmission constraints received from the NA, the IOOC SCUC optimization execution process determines the optimal outage schedules considering user set optimality criteria (e.g., relative and/or absolute MIP gaps). The resulting optimal outage schedules are verified in a subsequent NA verification (308). This follow-up NA run verifies the network conditions with the optimal outage schedule generated by the IOOC SCUC optimization execution. The outages can be simulated by inserting "compensating injections" computed by the IOOC SCUC optimization execution at line ends. Compensating injections are mathematical constructs in the model representing power that are inserted (supply) or taken away (demand) at the connecting nodes of the simulated "outaged" transmission equipment, and appropriate times, to emulate the effects of the actual outages. Because the NA is based on an AC power flow analysis, the resulting optimal outage schedules can be verified using an NA execution.

If one or more violations of line flow limits are identified by the NA verification, the IOOC computational method 300 determines this status (310) and optionally, the process flow returns to perform a further IOOC SCUC optimization execution with an extended set of constraints selected to prevent the violations. If the NA verification completes without such line flow limit violations, the IOOC computational method 300 completes and the optimal outage schedules are distributed to the energy delivery system 100 for implementation.

Figure 4:
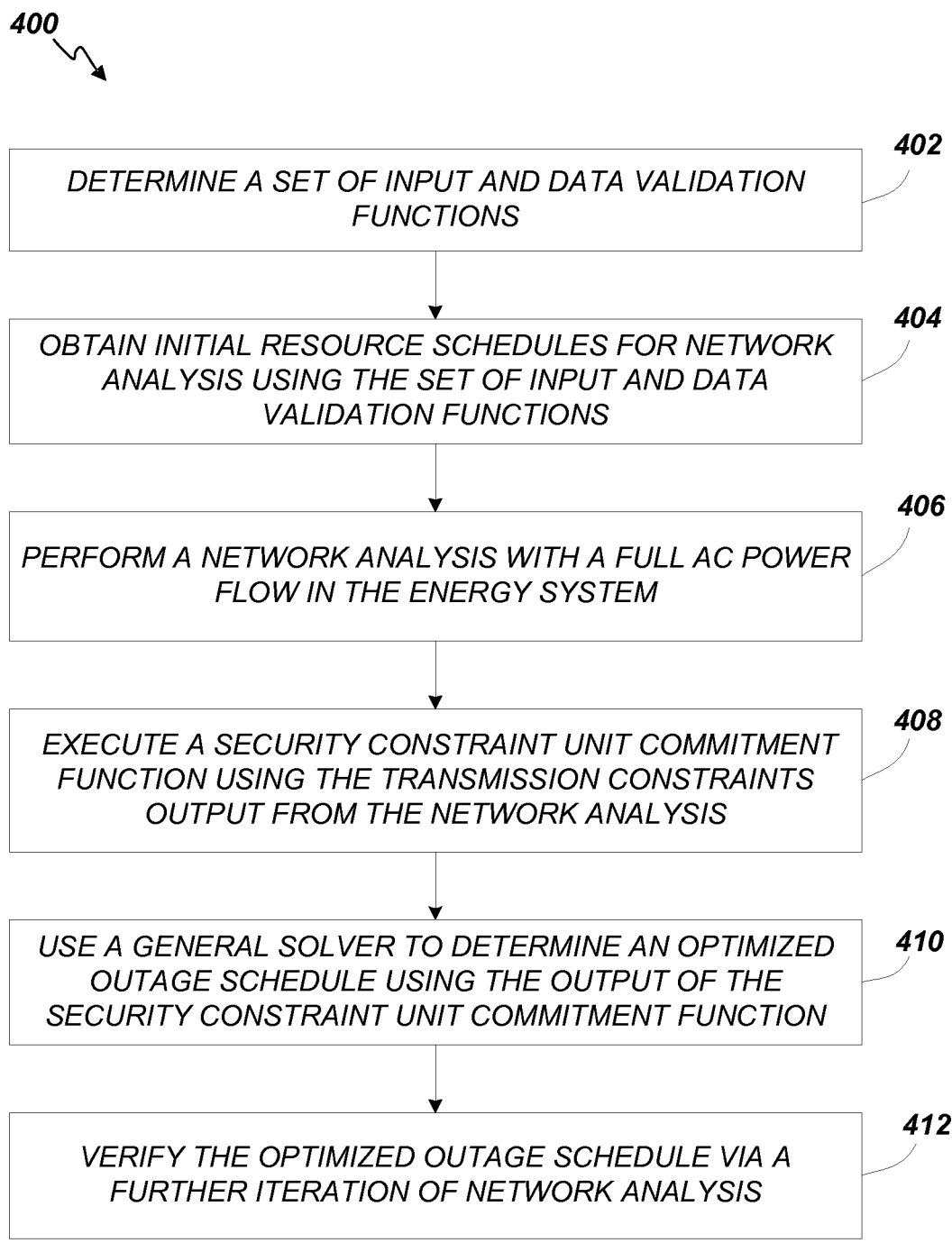
FIG. 4 a flowchart depicting an additional example method according to embodiments of the present invention.

FIG. 4 depicts a flowchart illustrating a second example of an IOOC method 400 according to embodiments of the present invention. An IOOC method 400 for scheduling repairs and maintenance outages in an energy system includes determining a set of input and data validation functions (402). The set of input and data validation functions include equipment outage requests from market participants. The set of input and data validation functions are used to obtain initial resource schedules for network analysis (404).

A network analysis is performed with a full AC power flow in the energy system (406). The network analysis is conducted using a topology configuration with the requested outages off. Transmission constraints are output by the network analysis as inputs to a security constraint unit commitment function. The security constraint unit commitment function is executed using the transmission constraints output from the network analysis (408). Outage line elements are included within the security constraint unit commitment function. A general solver is used to determine an optimized outage schedule using the output of the security constraint unit commitment function (410).

The optimized outage schedule is verified via a further network analysis (412). If line flow violations are detected by the network analysis, a security constraint unit commitment function with additional constraints is executed to determine a revised optimized outage schedule. The optimized outage schedule is distributed to a generation control and load management system. Operation of generator resources and management of loads to deliver energy to customers is directed based on the optimized outage schedule.

Example

After developing a complete IOOC system 102 implemented according to embodiments of the present invention suitable for use by a major U.S. ISO managing an energy deliver system 100, the example IOOC system 102 was extensively tested. Numerous test cases were run using actual market data from a sample sequence of elapsed days and with actual outages for both generating and transmission resources.

The test cases included fixed case runs as a control and flexible case runs. The fixed case runs involved rolling back existing outages from the test data and creating fixed outage requests to force the IOOC system 102 to schedule corresponding outages at the same times as the actual outages. For the flexible test cases, outage requests were extended and, in some cases, new outage scheduling windows were created to allow the IOOC system 102 to determine the different "optimal" schedules.

Figures 5A, 5B:
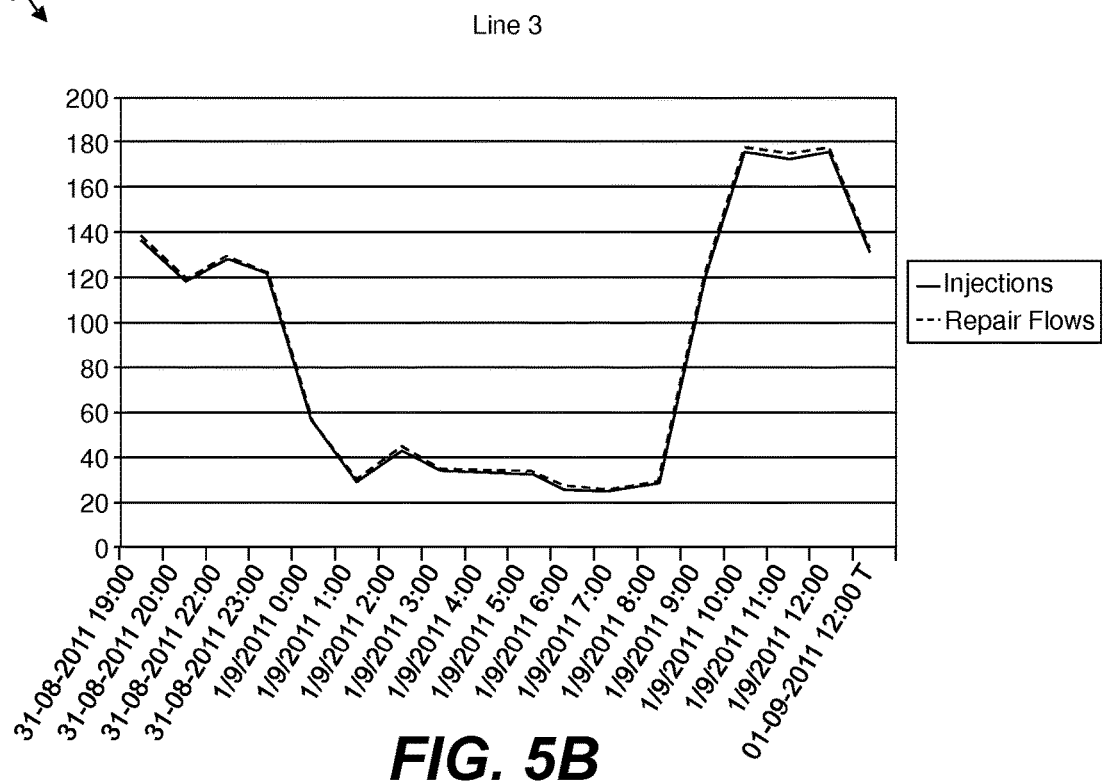
FIG. 5A is table of example test case data used to verify operation of the systems and methods of embodiments of the present invention.
FIG. 5B is a graph illustrating correlation of example outage flows determined by the integrated outage coordination system with output of a network analysis verification according to embodiments of the present invention.

The test data table 500A depicted in FIG. 5A provides an example of a five day test case and the results output from the IOOC system 102 for a few example flexible test case outages. Each resource includes a name field and an identifier field to uniquely identify the resource. The outage column indicates the actual outage hours for the resource. The repair column indicates the duration of the repair and an identifier for the repair. The repair schedule column indicates the output of the IOOC system 102 in terms of optimal scheduled outage times. The repair period column indicates the outage windows requested.

These results were verified as successful for both feasibility and reasonableness. Testing the correctness of the determined optimal transmission switching output was particularly revealing of the accuracy of the IOOC system's ability to determine an optimal result. Using resource "Line 3" from the test data table 500A of FIG. 5A as an example, the graph 500B in FIG. 5B of line flow (in MW) through Line 3 over time, illustrates how well the outage (e.g., simulated using compensation injections) flows (i.e., flows in lines that have requests for an outage) obtained from the IOOC SCUC optimization execution process align or correspond with the outage flows obtained by the NA verification run. As can be seen in the graph 500B, the compensating injections (calculated by the IOOC) represented by the solid plot line are almost perfectly tracked by the repair flows (calculated by the NA) represented by the dashed plot line. The SCUC used in the IOOC system and in market optimizations is based on a simplified direct current (DC) power flow approximation of actual (e.g., more complex) alternating current (AC) NA. The close correlation of the two lines plotted in graph 500B shows that the errors of this approximation are relatively small.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of coordinating scheduled maintenance outages for one or more generator resources and one or more transmission resources of an energy delivery system, to control a shutdown of the one or more generator resources or the one or more transmission resources, by the energy delivery system, comprising:

determining a set of input and data validation functions, the determining of the set of input and data validation functions comprising receiving at least one maintenance outage request from at least one market participant of the energy delivery system for at least one of the one or more generator resources and the one or more transmission resources, the at least one maintenance outage request including an outage cost as a function of time, duration, or time and duration, one or more allowed repair windows with penalties for window violations, or a combination thereof;

obtaining, by an integrated optimal outage coordination (IOOC) system, initial resource schedules for network analysis using the set of input and data validation functions;

performing, by the IOOC system, a first network analysis with a full AC power flow in the energy delivery system;

executing, by the IOOC system, a first security constraint unit commitment function using transmission constraints output from the network analysis;

determining, by the IOOC system, a system-wide optimized maintenance outage schedule using an output of the first security constraint unit commitment function;

distributing, by the IOOC system, the system-wide optimized maintenance outage schedule to a generation control and load management system; and controlling operation of the one or more generator resources, by the energy delivery system, such that the one or more generator resources are shut down in accordance with a first date, a first time, and a first duration of the system-wide optimized maintenance outage schedule, and controlling operation of the one or more transmission resources such that the one or more transmission resources are shut down in accordance with a second date, a second time, and a second duration of the system-wide optimized maintenance outage schedule;
wherein the system-wide optimized maintenance outage schedule specifies a schedule of planned maintenance outages.

2. The method of claim 1, wherein the one or more generator resources include one or more generators, and the one or more transmission resources include one or more transmission lines.

3. The method of claim 1, wherein performing the network analysis further comprises:
using a topology configuration with equipment outage requests off.

4. The method of claim 1, wherein determining the system-wide optimized maintenance outage schedule comprises:
using a general solver application.

5. The method of claim 1, further comprising:
verifying the system-wide optimized maintenance outage schedule,
wherein verifying the system-wide optimized maintenance outage schedule comprises performing a second network analysis.

6. The method of claim 5, further comprising:
executing, responsive to detection of line violations by the second network analysis, a second security constraint unit commitment function with additional constraints to determine a revised system-wide optimized outage schedule.

7. The method of claim 1, wherein the at least one maintenance outage request further includes an outage duration, repair request groupings, repair request group constraints, or any combination thereof.

8. An energy delivery system, comprising:
one or more generator resources;
one or more transmission lines;
an integrated optimal outage coordination (IOOC) system coupled to control the one or more generator resources and the one or more transmission lines;
an equipment outage scheduler coupled to the IOOC system;
an energy management system coupled to the IOOC system;
a plurality of market participants coupled via a network to the IOOC system;
a forecasting application coupled to the IOOC system;
a transmission network database coupled to the IOOC system,
wherein the IOOC system includes a processor coupled to a memory, the memory having a first plurality of instructions stored therein that, when executed by the processor, cause the IOOC system to:
determine a set of input and data validation functions, the determination of the set of input and data validation functions comprising receipt of at least one maintenance outage request from a market participant of the plurality of market participants, the at least one maintenance outage request including an outage cost as a function of time, duration, or time and duration, one or more allowed repair windows with penalties for window violations, or a combination thereof;
obtain initial resource schedules for network analysis using the set of input and data validation functions;
perform a first network analysis with a full AC power flow in the energy delivery system;
execute a first security constraint unit commitment function using transmission constraints output from the network analysis; and
determine a system-wide optimized maintenance outage schedule using an output of the first security constraint unit commitment function;
wherein the processor of the IOOC system is further configured to:
control operation of the one or more generator resources such that at least one of the one or more generator resources is shut down in accordance with a first date, a first time, and a first duration of the system-wide optimized maintenance outage schedule; and
control operation of the one or more transmission lines such that at least one of the one or more transmission lines is shut down in accordance with a second date, a second time, and a second duration of the system-wide optimized maintenance outage schedule;
wherein the system-wide optimized maintenance outage schedule specifies a schedule of planned maintenance outages.

9. The system of claim 8, wherein the one or more generator resources include one or more generators.

10. The system of claim 8, wherein the first plurality of instructions that, when executed, cause the processor to perform network analysis, further cause the processor to perform network analysis using a topology configuration with equipment outage requests off.

11. The system of claim 8, wherein the first plurality of instructions that, when executed, cause the processor to determine the system-wide optimized maintenance outage schedule, further cause the processor to use a general solver application.

12. The system of claim 8, wherein the first plurality of instructions that, when executed, cause the processor to perform the network analysis, further cause the processor to verify the system-wide optimized maintenance outage schedule, via performing a second network analysis.

13. The system of claim 12, wherein the first plurality of instructions that, when executed, further cause the processor to determine if line flow violations are detected by the second network analysis, execute a further security constraint unit commitment function with additional constraints, and determine a revised system-wide optimized outage schedule.

14. The energy delivery system of claim 8, wherein the at least one maintenance outage request further includes an outage duration, repair request groupings, repair request group constraints, or any combination thereof.

15. An energy delivery system, comprising:
one or more generator resources;
one or more transmission lines;
an integrated optimal outage coordination (IOOC) system coupled to control the one or more generator resources and the one or more transmission lines;
an equipment outage scheduler coupled to the IOOC system;
an energy management system coupled to the IOOC system;

a plurality of market participants coupled via a network to the IOOC system;
a forecasting application coupled to the IOOC system;
a transmission network database coupled to the IOOC system,
wherein the IOOC system includes a processor coupled to a memory, the memory having a first plurality of instructions stored therein that, when executed by the processor, cause the IOOC system to:
determine a set of input and data validation functions, the determination of the set of input and data validation functions comprising receipt of at least one maintenance outage request from at least one market participant of the plurality of market participants, the at least one maintenance outage request including an outage cost as a function of time, duration, or time and duration, one or more allowed repair windows with penalties for window violations, or a combination thereof;
obtain initial resource schedules for network analysis using the set of input and data validation functions;
perform a first network analysis with a full AC power flow in the energy delivery system;
execute a first security constraint unit commitment function using transmission constraints output from the network analysis; and
determine a system-wide optimized maintenance outage schedule using an output of the first security constraint unit commitment function;
wherein the processor of the IOOC system is configured to:
control operation of the one or more generator resources such that a ramp capability of at least one of the one or more generator resources is reduced in accordance with a first date, a first time, and a first duration of the system-wide optimized maintenance outage schedule; and
control operation of the one or more transmission lines such that a transmission capacity of at least one of the one or more transmission lines is reduced in accordance with a second date, a second time, and a second duration of the system-wide optimized maintenance outage schedule;
wherein the system-wide optimized maintenance outage schedule specifies a schedule of planned maintenance outages.

16. The system of claim 15, wherein the one or more generator resources include one or more generators.

17. The system of claim 15, wherein the first plurality of instructions that, when executed, cause the processor to perform network analysis, further cause the processor to perform network analysis using a topology configuration with equipment outage requests off.

18. The system of claim 15, wherein the first plurality of instructions that, when executed, cause the processor to perform the network analysis, further cause the processor to verify the system-wide optimized maintenance outage schedule, via performing a second network analysis.

19. The system of claim 18, wherein the first plurality of instructions that, when executed, further cause the processor to determine whether line flow violations are detected by the second network analysis, and responsive to detection of line flow violations execute a further security constraint unit commitment function with additional constraints, and determine a revised system-wide optimized maintenance outage schedule.

20. The energy delivery system of claim 15, wherein the at least one maintenance outage request further includes an outage duration, repair request groupings, repair request group constraints, or any combination thereof.

* * * * *